United States Patent [19]
Kroscher et al.

[11] Patent Number: 5,992,308
[45] Date of Patent: Nov. 30, 1999

[54] COOKING VESSEL

[75] Inventors: Todd W. Kroscher, Two Rivers; Deborah M. Lonneman, Manitowoc; Gerry T. Paul, Whitelaw, all of Wis.

[73] Assignee: Newell Operating Company, Freeport, Ill.

[21] Appl. No.: 09/113,660

[22] Filed: Jul. 10, 1998

[51] Int. Cl.⁶ ............................................... A47J 37/12
[52] U.S. Cl. ........................... 99/422; 99/403; 126/373; 220/573.1; D7/354
[58] Field of Search ................ 99/422, 403; 126/373; 220/573.1, 669, 675, 4.22, 4.24; D7/354

[56] References Cited

U.S. PATENT DOCUMENTS

| D. 109,481 | 5/1938 | Jackson | D7/354 |
|---|---|---|---|
| 127,900 | 6/1872 | Lee | 99/422 |
| D. 204,996 | 6/1966 | Lepoix | D7/354 |
| 218,411 | 8/1879 | Wassmer et al. | |
| 377,712 | 2/1888 | Eymer . | |
| 950,844 | 3/1910 | Dolan | 220/212 |
| 2,177,487 | 10/1939 | Howlett | 220/212 |
| 4,201,795 | 5/1980 | Yamanaka | 220/573.1 X |
| 4,280,032 | 7/1981 | Levinson | 99/417 X |
| 4,873,918 | 10/1989 | Goldman | 99/403 |
| 4,982,656 | 1/1991 | Stone | 99/403 |
| 5,033,453 | 7/1991 | Loyd et al. | 126/384 |
| 5,086,939 | 2/1992 | Foulkes, Jr. | 220/94 A |
| 5,307,951 | 5/1994 | Kuhn | 220/771 |
| 5,377,859 | 1/1995 | Hacker | 220/287 |
| 5,415,082 | 5/1995 | Naga | 99/403 |
| 5,615,607 | 4/1997 | Delaquis et al. | 99/409 |

FOREIGN PATENT DOCUMENTS

| 3101091 | 7/1982 | Germany | 99/422 |
|---|---|---|---|

*Primary Examiner*—Reginald L. Alexander
*Attorney, Agent, or Firm*—Foley & Lardner

[57] ABSTRACT

A cooking vessel includes a circular bottom plate and an upwardly and outwardly extending side wall, which define an interior cooking region. The side wall has a flangeless upper edge that is square in configuration. The cooking vessel further includes a primary handle attached to the side wall proximate a corner of the flangeless upper edge.

20 Claims, 4 Drawing Sheets

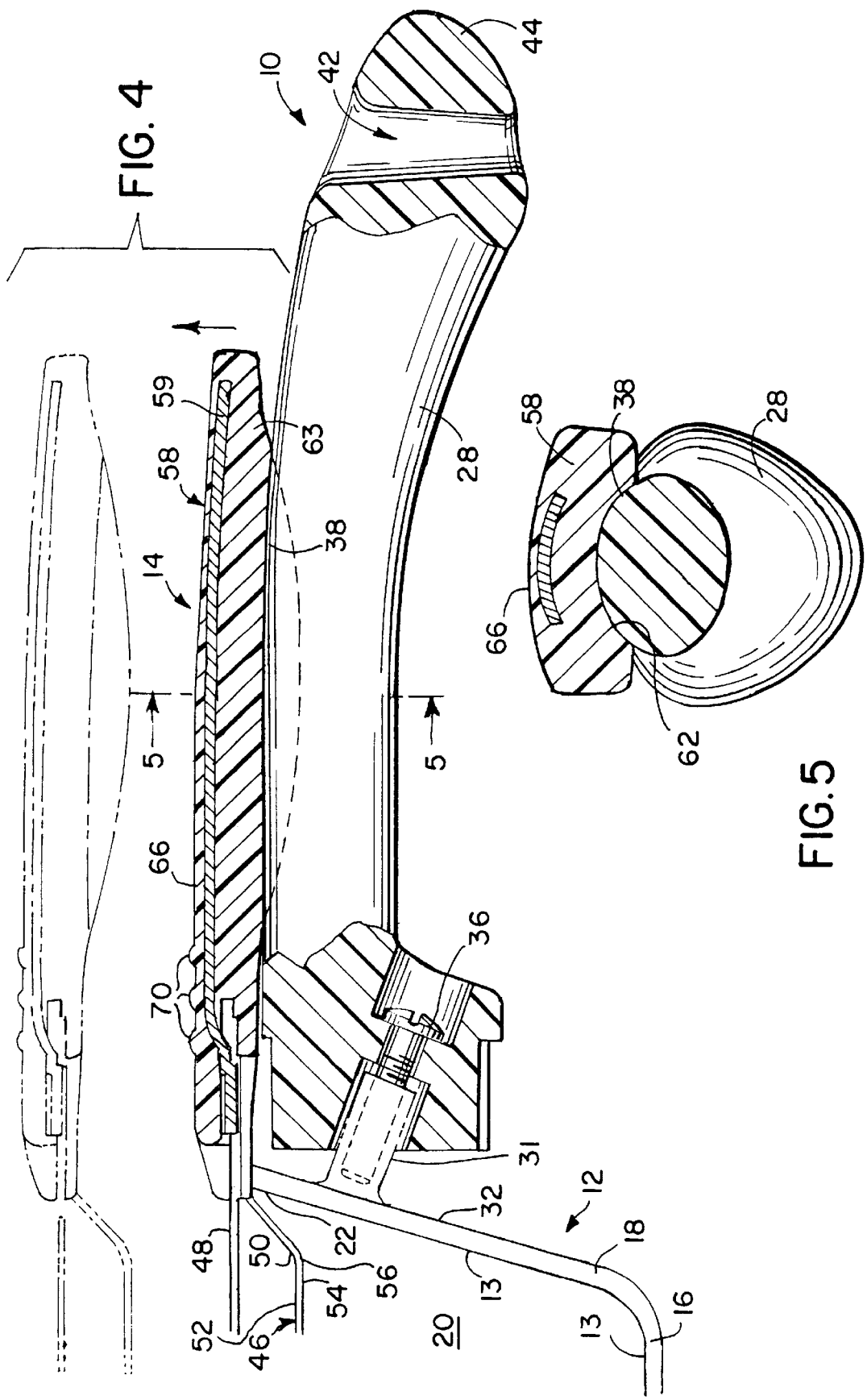

COOKING VESSEL

FIELD OF THE INVENTION

The present invention relates to a cooking or baking vessel, such as a pot or pan. More particularly, the present invention relates to a cooking vessel having a circular bottom and a square top. The cooking vessel of the present invention may further include a square-shaped lid.

BACKGROUND OF THE INVENTION

Conventional pots are circular in configuration, with a round bottom plate, a side wall extending upwardly from the bottom plate and having a circular upper edge, and a handle projecting from the side wall. Some of these pots further include a circular or dome-shaped lid with a single handle or knob projecting from the top center of the lid.

Several problems exist with conventional pots. First, because these pots typically have a vertical side wall, it may be difficult for a user, particularly with larger volume pots, to view the contents inside. Second, the circular configuration of the side wall hampers the user's ability to pour liquids from the pot neatly, as there is no definite channel along which the liquids may flow. Finally, the centrally disposed knob on the lid is not ideally located, since the user must reach over the pot to remove the lid, thereby subjecting the user's arm to hot air or steam. In addition, when the lid is placed upside down, it rocks or tips about the centrally disposed handle, making the handle difficult to access.

In light of the foregoing, there is a need for an improved cooking vessel. In particular, it is desirable to provide a cooking vessel with increased visibility of the contents within. It is further desirable to provide a cooking vessel that facilitates removal of food or liquids placed therein. Finally, it is desirable to provide a cooking vessel that protects the user from rising steam or hot air.

SUMMARY OF THE PRESENT INVENTION

In accordance with one aspect of the present invention, a cooking vessel includes a circular bottom plate, a side wall, and a primary handle attached to the side wall. The side wall extends upwardly and outwardly from the circular bottom plate to define an interior cooking region. The side wall has a flangeless upper edge that is square in configuration. The primary handle is attached to the side wall proximate a corner of the flangeless upper edge.

In accordance with another aspect of the invention, a cooking utensil includes an open vessel and a square lid. The open vessel has a circular bottom plate and an upwardly extending side wall which define an interior cooking region. The side wall includes a flangeless upper edge having a square configuration. The square lid is engageable with the open vessel to cover the interior cooking region.

In accordance with still another aspect of the invention, a cooking vessel includes a circular bottom plate, a side wall, a primary handle and a removable lid. The side wall, which extends upwardly from the circular bottom plate to define an interior cooking region, has an upper edge that is square in configuration. The primary handle is attached to the side wall proximate a corner of the upper edge. The lid is removably coupled to the upper edge of the side wall to cover the interior cooking region.

In accordance with a further aspect of the invention, a cooking utensil includes an open vessel having a circular bottom plate and a side wall, which define an interior cooking region. The side wall extends upwardly from the circular bottom plate to a flangeless upper edge having at least one corner. The cooking utensil also includes a lid. The lid is engageable with the open vessel to cover the interior cooking region and has at least one corner which corresponds with the at least one corner of the open vessel.

Other principal features and advantages of the invention will become apparent to those skilled in the art upon review of the following drawings, the detailed description and the appended claims.

BRIEF DESCRIPTION OF THE DRAWINGS

The present invention will become more fully understood from the following detailed description, taken in conjunction with the accompanying drawings, wherein like reference numerals denote like elements, in which:

FIG. 4 is a partial cross-sectional view of the primary handles of the cooking vessel;

FIG. 5 is a cross-sectional view taken generally along the line 5—5 of FIG. 4;

DETAILED DESCRIPTION OF THE PREFERRED EMBODIMENTS

Figure 3:
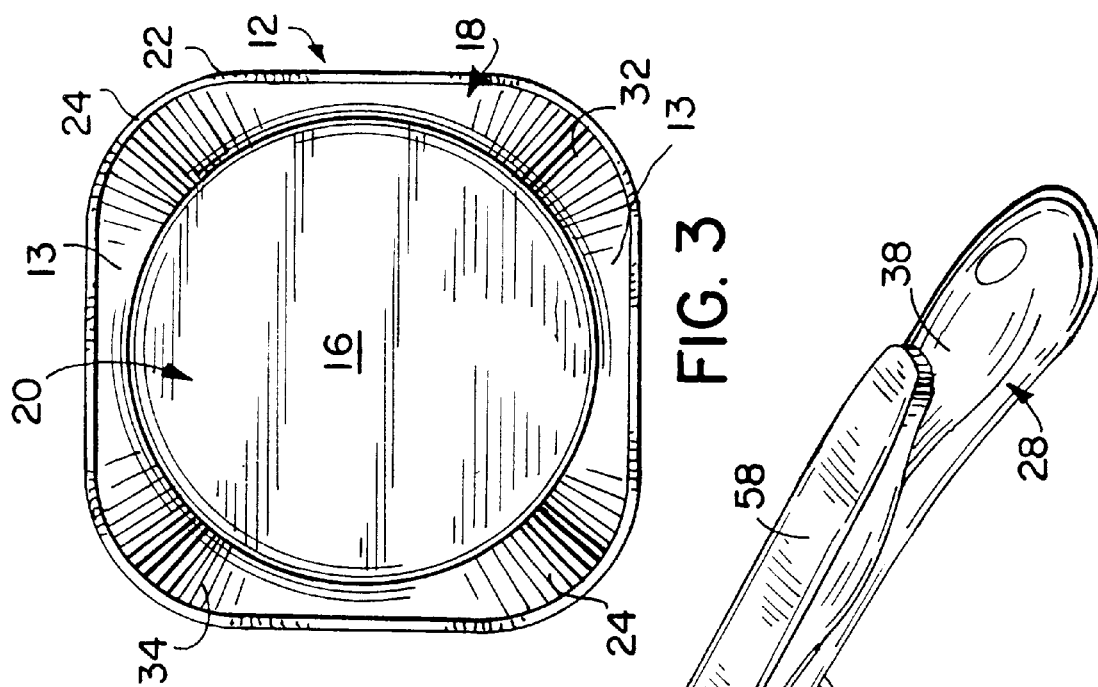
FIG. 3 is a top plan view of the open vessel of FIG. 2 with the handles removed.
Figure 1:
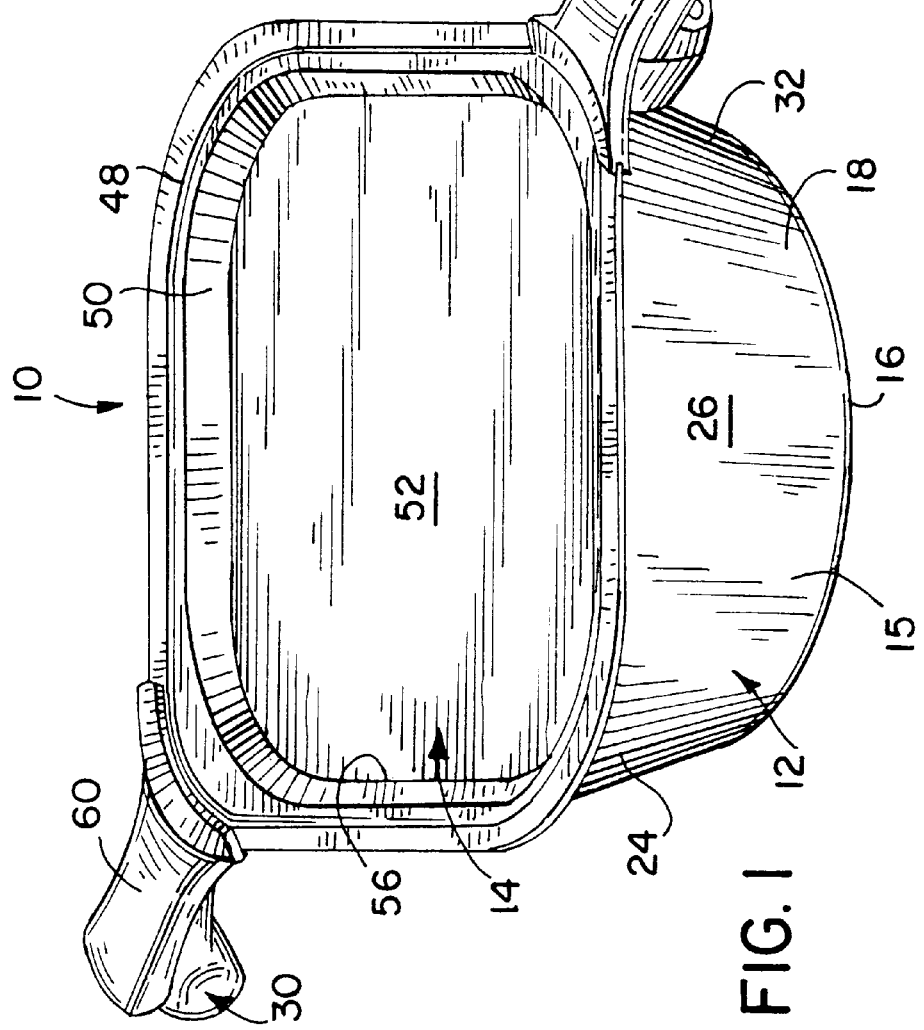
FIG. 1 is a perspective view of a cooking vessel, according to a preferred embodiment of the present invention, including an open vessel and a lid, each having primary and secondary handles.
Figure 2:
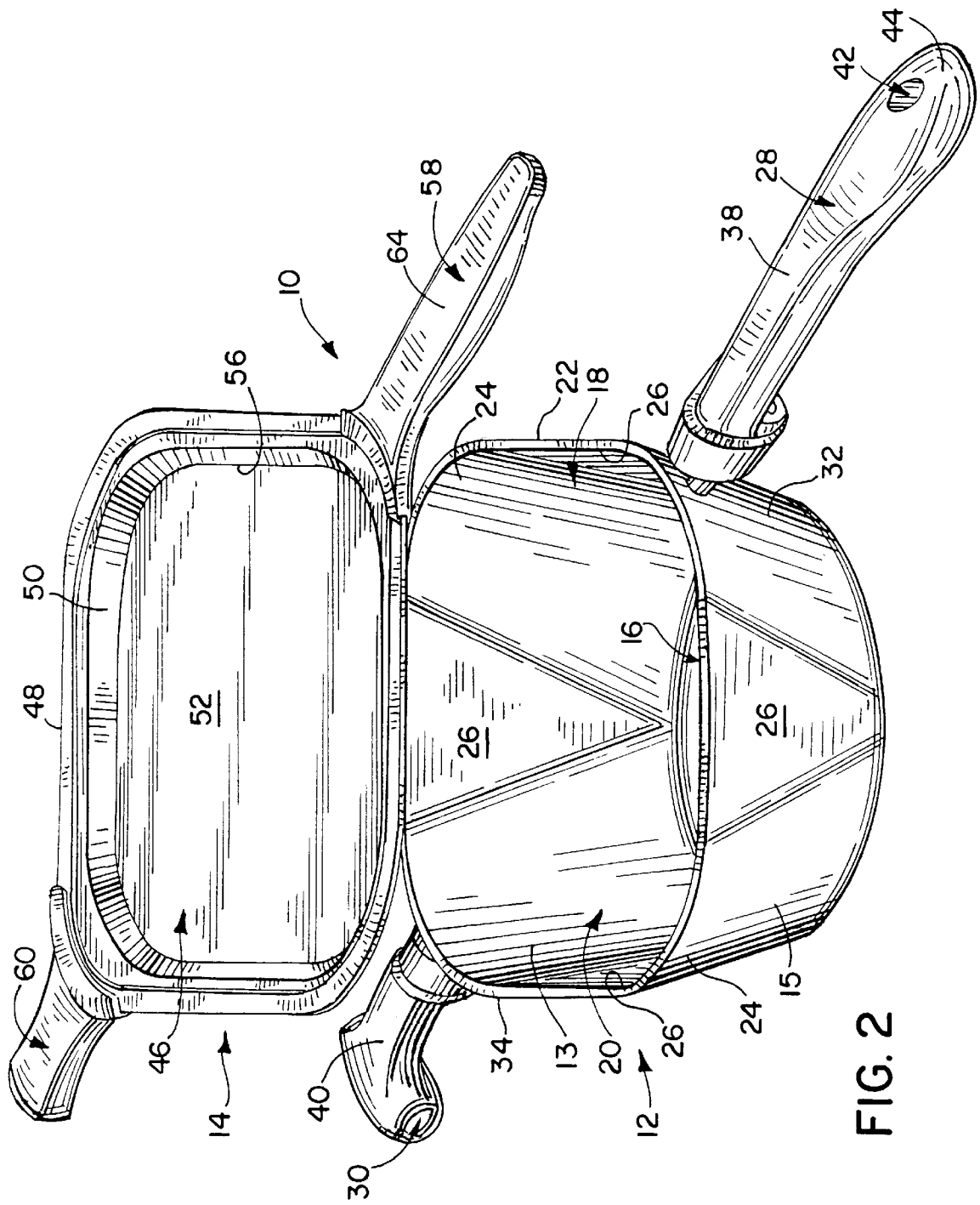
FIG. 2 is a perspective view of the cooking vessel of FIG. 1 with the lid removed from the open vessel.

Referring generally to FIGS. 1–3, an exemplary cooking utensil or vessel 10 in accordance with a preferred embodiment of the invention is provided. Cooking vessel 10 is depicted in FIG. 1 as a pot. However, cooking vessel 10 may also be a pan, such as a fry or saute pan, or a casserole or other type of baking dish (not shown). Cooking vessel 10 includes an open vessel 12 and a removable lid 14 made of a suitable material for conducting heat, such as stainless steel or anodized aluminium. An interior surface 13 (FIGS. 2 and 3) of open vessel 12 may be coated with a non-stick and/or scratch-resistant material, such as SCRATCH-GUARD™ available from Dupont, or any other well-known non-stick and/or scratch-resistant materials. An exterior surface 15 of open vessel 12 may be covered with porcelain (not shown) to present an aesthetic and easy-to-clean surface.

Open vessel 12 includes a bottom plate 16 and a side wall 18 extending upwardly and outwardly from bottom plate 16 to define an interior cooking region 20. Bottom plate 16, which is circular in configuration, is adapted to fit standard size stove top burners (e.g., 6" and 9" diameter burners) to provide for optimum heating of bottom plate 16. However, other sizes of vessels are also contemplated, such as an oversized vessel having a bottom plate 16 that is 11" in diameter. Side wall 18 has an upper edge 22 that is substantially square in configuration. Thus, side wall 18 extends from circular bottom plate 16 to square upper edge 22. Upper edge 22 is preferably flangeless to facilitate pouring of liquids from open vessel 12. It should be appreciated, however, that upper edge 22 may also be provided with a flange.

The round-to-square configuration of open vessel 12 provides several advantages. Because side wall 18 extends upwardly and outwardly from bottom plate 16, providing greater interior cooking space at the top, open vessel 12 enhances visibility of the contents placed in interior cooking region 20 and maximizes the use of the stove top space. In addition, the square configuration of upper edge 22 facilitates the removal of food or liquids from interior cooking region 20. These contents may be poured from open vessel 12 by directing them along a corner 24 of side wall 18. They may also be easily scraped from open vessel 12 by passing a spatula (not shown) along flat portions 26 of side wall 18.

Figure 6:
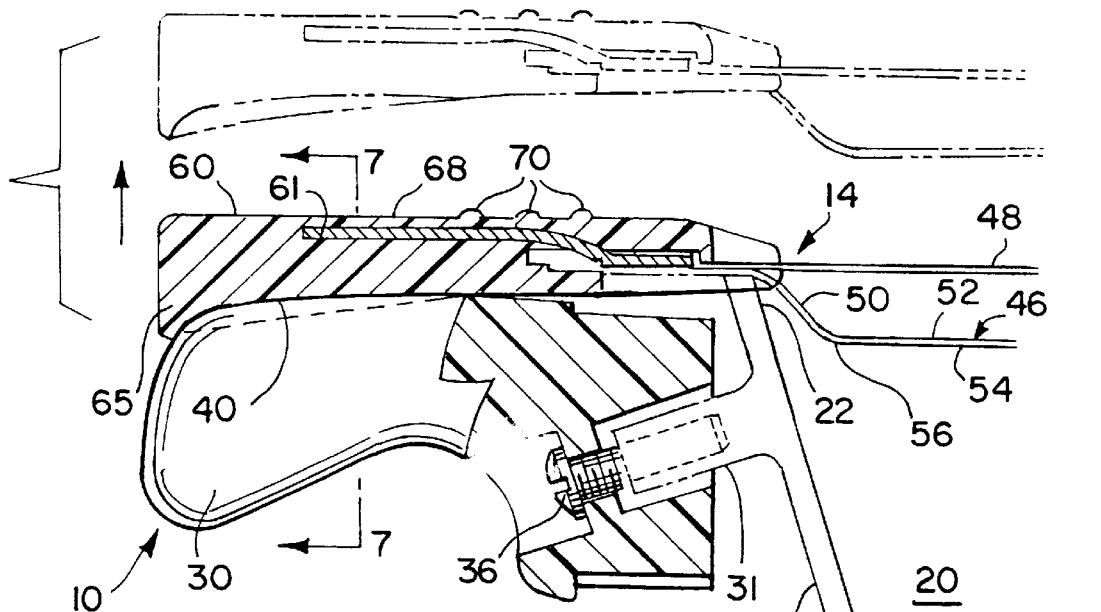
FIG. 6 is a partial cross-sectional view of the secondary handles of the cooking vessel.
Figure 7:
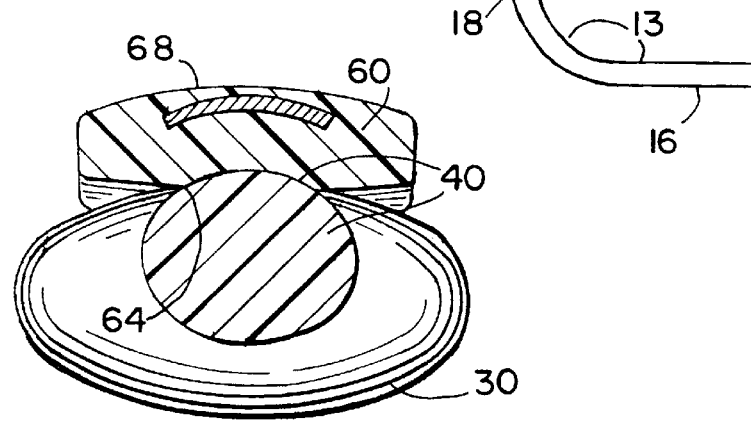
FIG. 7 is a cross-sectional view taken generally along the line 7—7 of FIG. 6.

In the preferred embodiment of the invention, open vessel 12 is provided with a primary handle 28 and a secondary handle 30. Primary and secondary handles 28 and 30 are oppositely disposed at respective corners 32 and 34 of side wall 18 and are attached to a bracket 31 extending from side wall 18 by a mechanical fastener, such as a bolt or screw 36 (FIGS. 4 and 6). Preferably, screw 36 does not extend into interior cooking region 20. The smooth profile of interior surface 13 of open vessel 12 makes cleaning easy, as there is no place for food to become trapped. In the alternative, handles 28 and 30 may be riveted to side wall 18. While two oppositely disposed handles are provided in the preferred embodiment, open vessel 12 may include a single handle. Handles 28 and 30 are located near upper edge 22 of side wall 18 for engagement with handles of lid 14, as will be described in greater detail below.

Primary and secondary handles 28 and 30 each have a convex upper surface 38 and 40, respectively, and are ergonomically designed to provide a user with a comfortable grip. The outer surface of handles 28 and 30 includes a heat-resistant material, such as silicone, capable of withstanding temperatures of at least 500° F., such that cooking vessel 10 may be placed in an oven. Handles 28 and 30 may be injection molded or otherwise formed of silicone. Silicone is preferable because of its high coefficient of friction, thereby providing the handle with a non-slip grip.

In addition, primary handle 28 has an opening 42 formed therein adjacent a distal end 44 of the handle. Opening 42 enables open vessel 12 to be stored overhead on a rack (not shown).

As discussed above, cooking vessel 10 further includes a lid 14. Lid 14 is preferably made of aluminium or stainless steel and may be manufactured by stamping. Lid 14 has a square configuration, complementary to that of upper edge 22 of side wall 18 for covering interior cooking region 20. Lid 14 includes a substantially planar member 46, a raised periphery 48 and a beveled portion 50. Substantially planar member 46 has a top surface 52 and a bottom surface 54 (FIGS. 4 and 6) as well as an edge 56. Beveled portion 50 extends upwardly from edge 56 of substantially planar member 46 and offsets raised periphery 48 from substantially planar member 46. Raised periphery 48 lies in a plane generally parallel to substantially planar member 46. When lid 14 is coupled to open vessel 12, raised periphery 48 rests atop upper edge 22 of side wall 18, such that beveled portion 48 and substantially planar member 46 are disposed within interior cooking region 20. Thus, when contents placed in interior cooking region 20 are subjected to heat, moisture that forms on the bottom surface of lid 14 may drip down beveled portion 50 into interior cooking region 20. Unlike conventional dome-shaped lids, when lid 14 is removed, condensation may drip or be easily shaken back into interior cooking region 20 of open vessel 12.

Top surface 52 of substantially planar member 46 is flat. This configuration is advantageous as it allows utensils, such as spoons or spatulas, or other items to be placed on top of lid 14. In addition, larger lids may be used separate from their respective open vessels as baking sheets for placement in an oven. The flat configuration of lid 14 also facilitates storage, as the open vessels may be stacked or hung from an overhead rack, and the lids separately stacked and stored. Lid 14 may be provided with ribs (not shown) to reinforce lid 14 and to prevent warping.

Lid 14 further includes a primary lid handle 58 and a secondary lid handle 60. Primary and secondary lid handles 58 and 60 are preferably attached to raised periphery 48 of lid 14 and are disposed at opposite corners thereof. Primary and secondary lid handles 58 and 60 engage primary and secondary vessel handles 28 and 30, respectively, when lid 14 covers interior cooking region 20. Each of primary and secondary lid handles 58 and 60 includes a steel portion 59 and 61, respectively, covered by a heat-resistant sleeve 63 and 65, respectively. In the preferred embodiment of the invention, sleeves 63 and 65 are made of silicone.

The extension of primary and secondary lid handles 58 and 60 from raised periphery 48 makes lid 14 superior to conventional lids. Conventional lids have a single handle or knob provided at the center of a top surface of the lid. The location of this knob requires a user to reach over the lid in order to remove it from the cooking vessel and may subject the user's arm to steam or hot air, which may escape from the interior cooking region of the cooking vessel when the lid is removed. In the present invention primary and secondary lid handles 58 and 60 extend from raised periphery 48. This arrangement of primary and secondary lid handles 58 and 60 keeps the user away from rising steam or hot air, since the user does not need to reach over cooking vessel 10 to remove lid 14. In addition, lid 14 will not wobble when placed upside down on a counter top, and lid handles 58 and 60 remain easily accessible in this position.

As illustrated in greater detail in FIGS. 4–7, primary and secondary lid handles 58 and 60 of the preferred embodiment of the invention are configured to rest atop respective primary and secondary handles 28 and 30 of open vessel 12. Primary lid handle 58 has a concave lower surface 62 (FIG. 5) which matingly engages convex upper surface 38 of primary vessel handle 28. Similarly, secondary lid handle 60 has a concave lower surface 64 (FIG. 7) which matingly engages convex upper surface 40 of secondary vessel handle 30. Accordingly, with one hand a user may simultaneously grasp primary lid handle 58 and primary vessel handle 28 to lift cooking vessel 10. The user may also grasp secondary lid handle 60 and secondary vessel handle 30 to aid in lifting cooking vessel 10. In the alternative, primary and secondary lid handles 58 and 60 may be provided with a latch to secure them to open vessel 12.

Primary and secondary lid handles 58 and 60 have respective upper surfaces 66 and 68, each of which includes a plurality of ridges 70 for preventing the user's hand from slipping and contacting cooking vessel 10. Ridges 70 may be bumps, grooves or any other arrangement that provides the user with tactile information as to the attached end of the handle.

It will be understood that the foregoing description is of the preferred embodiments of this invention and that the invention is not limited to the specific forms shown or described. For example, while the preferred embodiment of the invention includes matingly engaging vessel and lid handles, it is also contemplated that the open vessel include latches, in lieu of handles, which extend upward and engage the lid. This and other modifications may be made in the design and arrangement of the elements without departing from the scope of the invention as expressed in the appended claims.

What is claimed is:

1. A cooking vessel comprising:
   a circular bottom plate;
   a side wall extending upwardly and outwardly from the circular bottom plate to define an interior cooking region, the side wall having a flangeless upper edge, the flangeless upper edge being square in configuration;
   a primary handle attached to the side wall proximate a corner of the flangeless upper edge; and
   a secondary handle attached to the side wall proximate a corner opposite that of the primary handle.

2. The cooking vessel of claim 1, wherein an outer surface of the primary handle includes a heat-resistant material capable of withstanding temperatures of at least approximately 500° F.

3. The cooking vessel of claim 2, wherein the heat-resistant material comprises silicone.

4. The cooking vessel of claim 1, further comprising a lid having a square configuration, the lid resting on the flangeless upper edge of the side wall when the lid covers the interior cooking region.

5. The cooking vessel of claim 4, wherein the lid includes a primary lid handle engageable with the primary handle attached to the side wall.

6. The cooking vessel of claim 5, wherein the lid include a secondary lid handle engageable with a secondary handle attached to the side wall.

7. The cooking vessel of claim 1, wherein the circular bottom plate and the side wall are comprised of aluminum.

8. The cooking vessel of claim 7, wherein the interior cooking region includes a non-stick coating.

9. A cooking utensil comprising:
   an open vessel including a circular bottom plate and a side wall extending upwardly from the circular bottom plate to a flangeless upper edge having at least one corner, the circular bottom plate and the side wall defining an interior cooking region;
   a primary handle attached to the side wall;
   a lid engageable with the open vessel to cover the interior cooking region, the lid including at least one corner corresponding to the at least one corner of the open vessel; and
   a primary lid handle attached to the lid, the primary lid handle being adapted to mate with the primary handle attached to the side wall when the lid covers the interior cooking region.

10. A cooking utensil comprising:
    an open vessel including a circular bottom plate and a side wall extending upwardly from the circular bottom plate to a flangeless upper edge having a square configuration, the circular bottom plate and the side wall defining an interior cooking region; and
    a square lid engageable with the open vessel to cover the interior cooking region.

11. The cooking utensil of claim 10, wherein the square lid is generally flat and has top and bottom surfaces, the top surface having a raised periphery, the bottom surface having a beveled portion,
    wherein, when the square lid covers the interior cooking region, the raised periphery rests on the flangeless upper edge and the beveled portion extends into the interior cooking region such that, when contents placed in the interior cooking region are subjected to heat, moisture that forms on the bottom surface of the square lid as a result of the heat can drip down the beveled portion into the interior cooking region.

12. The cooking utensil of claim 10, wherein the open vessel includes a primary vessel handle attached to the side wall proximate a corner of the flangeless upper edge.

13. The cooking utensil of claim 12, wherein the lid includes a primary lid handle matingly engageable with the primary vessel handle.

14. The cooking utensil of claim 12, wherein the open vessel further includes a secondary vessel handle attached to the side wall proximate a corner opposite that of the primary vessel handle.

15. The cooking utensil of claim 14, wherein the lid includes primary and secondary lid handles matingly engageable with the respective primary and secondary vessel handles.

16. The cooking utensil of claim 10, wherein the circular bottom plate and the side wall are comprised of aluminum, and the interior cooking region includes a non-stick coating.

17. A cooking vessel comprising:
    a circular bottom plate;
    a side wall extending upwardly from the circular bottom plate to define an interior cooking region, the side wall having an upper edge, the upper edge being square in configuration;
    a primary handle attached to the side wall proximate a corner of the upper edge; and
    a lid removably coupled to the upper edge of the side wall to cover the interior cooking region.

18. The cooking vessel of claim 17, wherein the upper edge is flangeless.

19. The cooking vessel of claim 17, further comprising a secondary handle attached to the side wall proximate a corner opposite that of the primary handle.

20. The cooking vessel of claim 19, wherein the lid includes oppositely disposed primary and secondary lid handles matingly engageable with the respective primary and secondary handles attached to the side wall when the lid covers the interior cooking region.

* * * * *